United States Patent
Kelley et al.

(10) Patent No.: US 7,707,551 B2
(45) Date of Patent: *Apr. 27, 2010

(54) CROSS-PLATFORM SOFTWARE DEVELOPMENT WITH A SOFTWARE DEVELOPMENT PERIPHERAL

(75) Inventors: David Kelley, Woodinville, WA (US); Larry Morris, Kirkland, WA (US); Sridhar S. Mandyam, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 1142 days.

This patent is subject to a terminal disclaimer.

(21) Appl. No.: 11/027,453

(22) Filed: Dec. 30, 2004

(65) Prior Publication Data

US 2005/0120335 A1 Jun. 2, 2005

Related U.S. Application Data

(62) Division of application No. 10/044,505, filed on Jan. 10, 2002, now Pat. No. 6,978,439.

(51) Int. Cl.
G06F 9/44 (2006.01)

(52) U.S. Cl. ............... 717/121; 717/103; 717/106; 717/124; 717/174

(58) Field of Classification Search .......... None
See application file for complete search history.

(56) References Cited

U.S. PATENT DOCUMENTS

| 5,581,740 | A | 12/1996 | Jones |
| 5,604,906 | A | 2/1997 | Murphy et al. |
| 5,666,334 | A | 9/1997 | Tokuyama et al. |
| 5,794,052 | A | 8/1998 | Harding |
| 5,889,988 | A * | 3/1999 | Held .................. 718/103 |
| 5,937,189 | A | 8/1999 | Branson et al. |
| 6,080,207 | A | 6/2000 | Kroening et al. |
| 6,247,140 | B1 | 6/2001 | Chase-Salerno et al. |
| 6,253,209 | B1 | 6/2001 | Chase-Salerno et al. |
| 6,536,037 | B1 | 3/2003 | Guheen et al. |

(Continued)

OTHER PUBLICATIONS

"TMS320C8x System-Level Synopsis", Texas Instruments Inc., Sep. 1995, pp. 1-75.

(Continued)

Primary Examiner—Michael J Yigdall
Assistant Examiner—Ben C Wang
(74) Attorney, Agent, or Firm—Lee & Hayes, PLLC

(57) ABSTRACT

A cross-platform development system includes a computing device that generates an image of an operating system, and a software development peripheral connected to the computing device that runs the operating system corresponding to the image. The software development peripheral communicates information, such as image data, generated by the operating system back to the computing device where the information is displayed on a display device connected to the computing device.

16 Claims, 7 Drawing Sheets

U.S. PATENT DOCUMENTS

| | | |
|---|---|---|
| 6,640,278 B1 | 10/2003 | Nolan et al. |
| 6,718,436 B2 | 4/2004 | Kim et al. |
| 6,721,713 B1 | 4/2004 | Guheen et al. |
| 6,772,192 B1 | 8/2004 | Fulton et al. |
| 6,775,830 B1 | 8/2004 | Matsunami et al. |
| 6,845,466 B2 | 1/2005 | Gold |
| 6,892,383 B1 * | 5/2005 | Arndt .......................... 718/1 |
| 6,978,439 B2 | 12/2005 | Kelley et al. |
| 7,191,445 B2 * | 3/2007 | Brokish ...................... 718/102 |
| 2002/0056047 A1 * | 5/2002 | Lehman ...................... 713/200 |
| 2002/0066075 A1 * | 5/2002 | Mowers et al. .............. 717/107 |
| 2005/0120335 A1 | 6/2005 | Kelley et al. |
| 2005/0125779 A1 * | 6/2005 | Kelley et al. ................ 717/138 |
| 2005/0257214 A1 * | 11/2005 | Moshir et al. ............... 717/171 |
| 2006/0075388 A1 * | 4/2006 | Kelley et al. ................ 717/124 |

OTHER PUBLICATIONS

Morsland et al., "Learning Operating Systems Structure and Implementation through the MPS Computer Systems Simulator", ACM SIGCSE, pp. 63-67, 1999.

Ionescu, "Application Level Virtual Memory Management in Real-Time Multiprocessor Systems", ACM SAC, pp. 610-614, 2000.

Gauthier et al. "Automatic Generation and Targeting of Application Specific Operating Systems and Embedded System Software", IEEE, pp. 679-835. 2001.

Anderson et al, "The Interaction of Architecture and Operating System Design". ACM pp. 108-120, 1991.

* cited by examiner

CROSS-PLATFORM SOFTWARE DEVELOPMENT WITH A SOFTWARE DEVELOPMENT PERIPHERAL

RELATED APPLICATIONS

This application is a divisional of and claims priority to U.S. patent application Ser. No. 10/044,505 entitled "Cross-Platform Software Development with a Software Development Peripheral" filed Jan. 10, 2002 to Kelley et al., the disclosure of which is incorporated by reference herein.

TECHNICAL FIELD

This invention relates to software development and, in particular, to cross-platform development of software applications and operating systems with a software development peripheral device.

BACKGROUND

Cross-platform development involves developing software, such as operating systems or application programs, such that the software operates with computers having different central processing units (CPUs) from one central processor unit type to another. Cross-platform development is typically accomplished by using a computer system to emulate different processors, or with a software development board connected to a computer system.

FIG. 1 illustrates a conventional cross-platform development system 100 that includes a computer system 102 having processor emulation components. Computer system 102 includes a central processing unit 104, an operating system 106, and a cross-platform development application 108 that includes a processor emulator 110. Processor emulator 110 emulates a virtual processor inside of central processing unit 104, where the virtual processor is of a different type than processor 104.

The cross-platform development application 108 includes components or application tools, such as processor emulator 110, that enable software developers to configure, build, and debug new software applications and operating systems. With components of the cross-platform development application 108, a developer can design a new operating system, such as for a personal digital assistant or hand-held computing device, and include various features and device drivers. An image 112 of the new operating system can then be downloaded to processor emulator 110 that appears as an independent processor, but is actually a virtual processor.

A developer can utilize processor emulation for cross-platform development to view and debug a new software application or operating system in a window displayed on a display device 114 connected to, or integrated with, computer system 102. Additionally, a developer can debug the new software application or operating system with a keyboard 116 and mouse 118 connected to computer system 102. Cross-platform development with processor emulation is simplified because external hardware to run and test a new software application or operating system does not need to be connected to computer system 102. Additionally, existing peripheral input/output devices, such as display 114, keyboard 116, and mouse 118, connected to computer system 102, can be utilized to interact with the software application or operating system being developed.

Although cross-platform development with processor emulation is simplified for a developer, a virtual processor only emulates one type of processor and runs up to ten-times slower than an actual central processing unit. Processor emulation does not provide a realistic representation of how a new software application or operating system will perform when executed with the actual central processing unit that the virtual processor is emulating. Consequently, processor emulation is not reliable as a software debug tool for a final version of a product.

Cross-platform development of a new software application or operating system with a software development board is an alternative to processor emulation. A software development board can be configured with different processors from different manufacturers, and can be configured with many different hardware options and configurations. When a developer is first creating a new software application or operating system, hardware and processor components are unknown design variables because features of the new software application or operating system can influence which hardware and processor components are ultimately selected by the developer.

FIG. 2 illustrates a conventional cross-platform development system 200 that includes a computer system 202 connected to a software development board 204. Computer system 202 includes a central processing unit 206, an operating system 208, and a debug transport layer 210. The debug transport layer 210 is a connection interface for a physical connection 212 to software development board 204. Typically, transport layer 210 is implemented as an Ethernet debug transport, and physical connection 212 is an Ethernet connection.

Software development board 204 includes a central processing unit 214, a read only memory (ROM) 216, and a random access memory (RAM) 218. Conventional software development board 204 also includes a system of connections 220 for peripheral input/output devices, such as a keyboard input/output 222 for an external keyboard 224, a mouse input/output 226 for an external mouse 228, and a display input/output 230 for an external display device 232. Software development boards also typically include additional debug connectors, debug indicators such as LEDs, and expansion slots for variable hardware configurations. These additional components also add to the expense a software development board.

Software development board 204 maintains a bootloader application 234 in ROM 216. A bootloader 234 is the only software code that is maintained on software development board 204 when the board is first set up for testing. The bootloader 234 communicates with computer system 202 via physical connection 212, or simply waits to receive an operating system image from computer system 202.

When a developer configures and builds a new operating system, an image 236 of the new operating system is downloaded to RAM 218 on software development board 204 via the debug transport layer 210 and physical connection 212. When the operating system image 236 is downloaded and stored in RAM 218, bootloader 234 transfers execution of the software development board 204 to the new operating system which executes on central processing unit 214. The developer can debug with the new operating system with the keyboard 224, mouse 228, and display device 232 connected to the software development board 204.

Software development boards that are configurable for different processors and the many different possible hardware components and configurations are expensive and require considerable user setup before any new software application or operating system can be tested. Initial setup can be tedious because software development boards are designed to be configurable. For example, some boards are sold new without a ROM component, and some boards require setup and configuration of a data input/output EPROM program, binary files, dip switch settings, and other similar configuration requirements.

Additionally, software development boards are designed to use peripheral input/output devices, such as a keyboard, a mouse, and/or a display, that are connected directly to the boards for user interaction. The additional requirement of direct-connect peripheral input/output devices adds to the already expensive initial cost of a software development board.

SUMMARY

A cross-platform software development system includes a computing device that generates an image of an operating system, and a software development peripheral connected to the computing device that executes the operating system corresponding to the image. The software development peripheral communicates information, such as image data, generated by the operating system back to the computing device where the information is displayed on a display device connected to the computing device.

The computing device includes a cross-platform development component that recognizes a configuration identification of the software development peripheral when the software development peripheral is communicatively linked with the computing device via a debug transport. The cross-platform development component generates the image of the operating system corresponding to the configuration identification of the software development peripheral. The computing device also includes a virtual input/output system to communicate the information generated by the operating system between the computing device and virtual device drivers of the software development peripheral.

BRIEF DESCRIPTION OF THE DRAWINGS

The same numbers are used throughout the drawings to reference like features and components.

DETAILED DESCRIPTION

The following describes systems and methods for a cross-platform development system that can be utilized to configure, build, and debug new software applications and operating systems. The cross-platform development system includes a software development peripheral that can also be utilized to test different central processing units from different manufacturers along with the with many different hardware options and configurations. For an operating system developer, the cross-platform development system provides an easy to use development resource, and also provides accurate and real-time operating system analysis.

Figure 1:
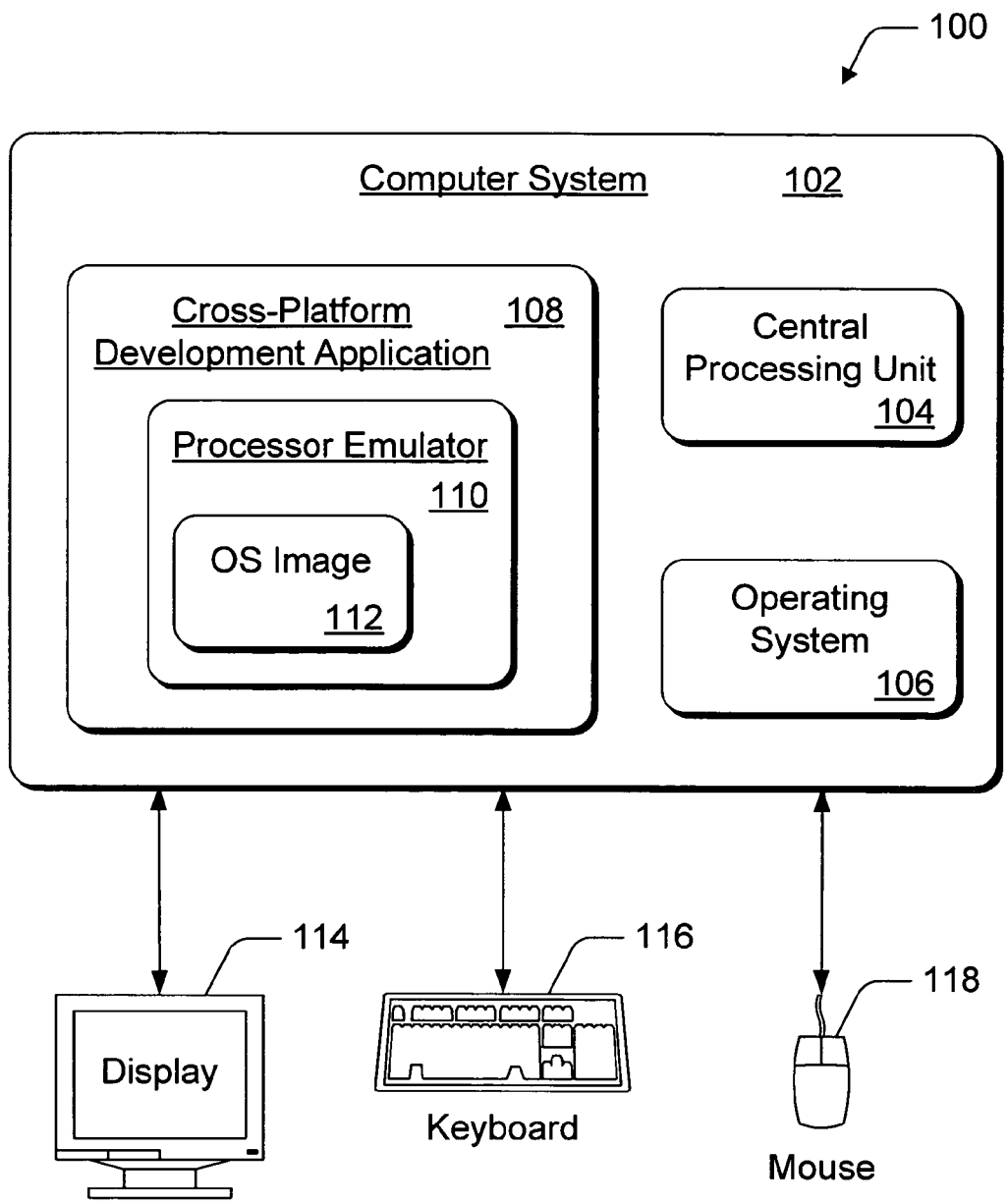
FIG. 1 illustrates a conventional cross-platform development system that includes a processor emulator.
Figure 2:
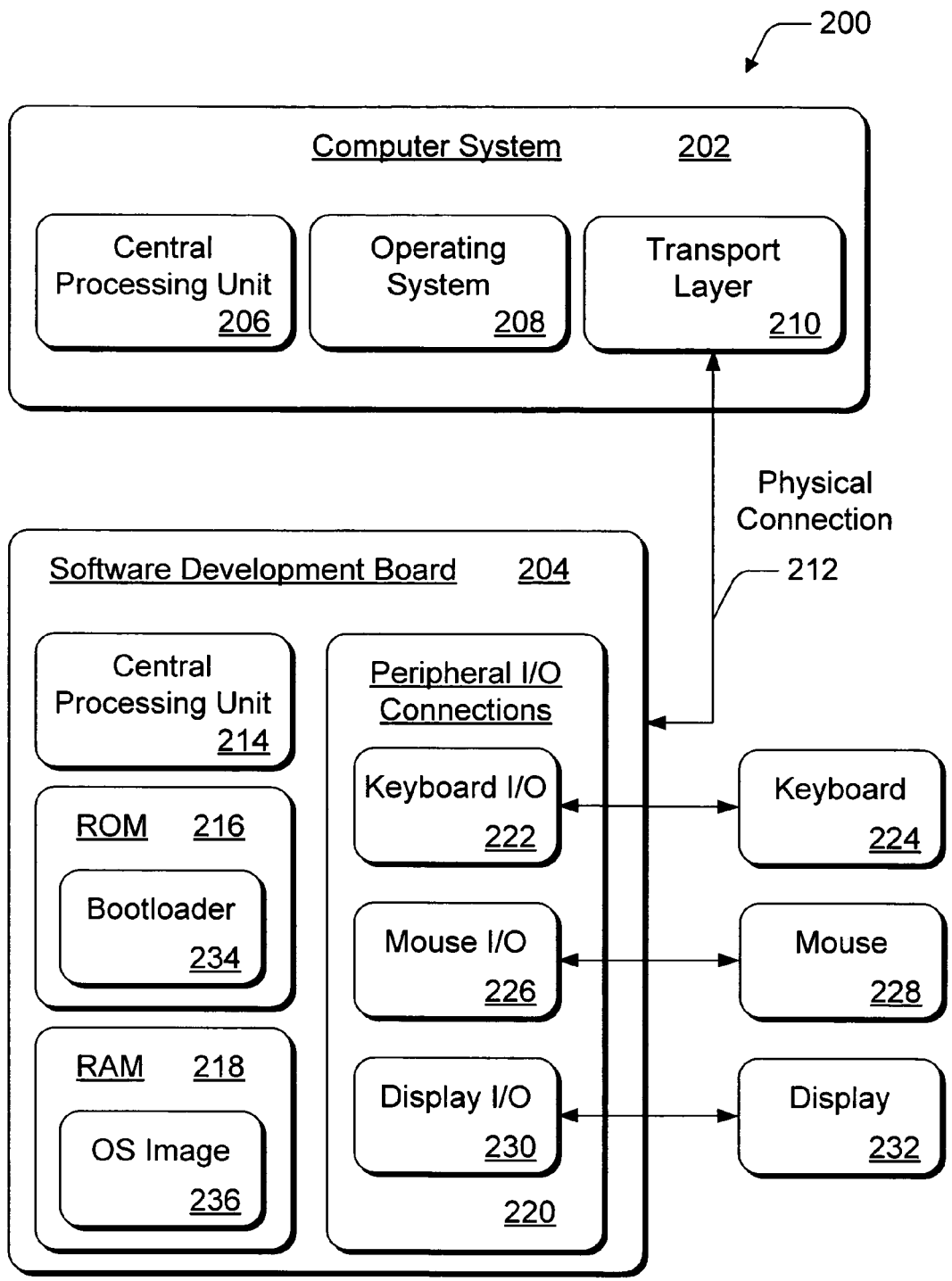
FIG. 2 illustrates a conventional cross-platform development system that includes a software development board.
Figure 3:
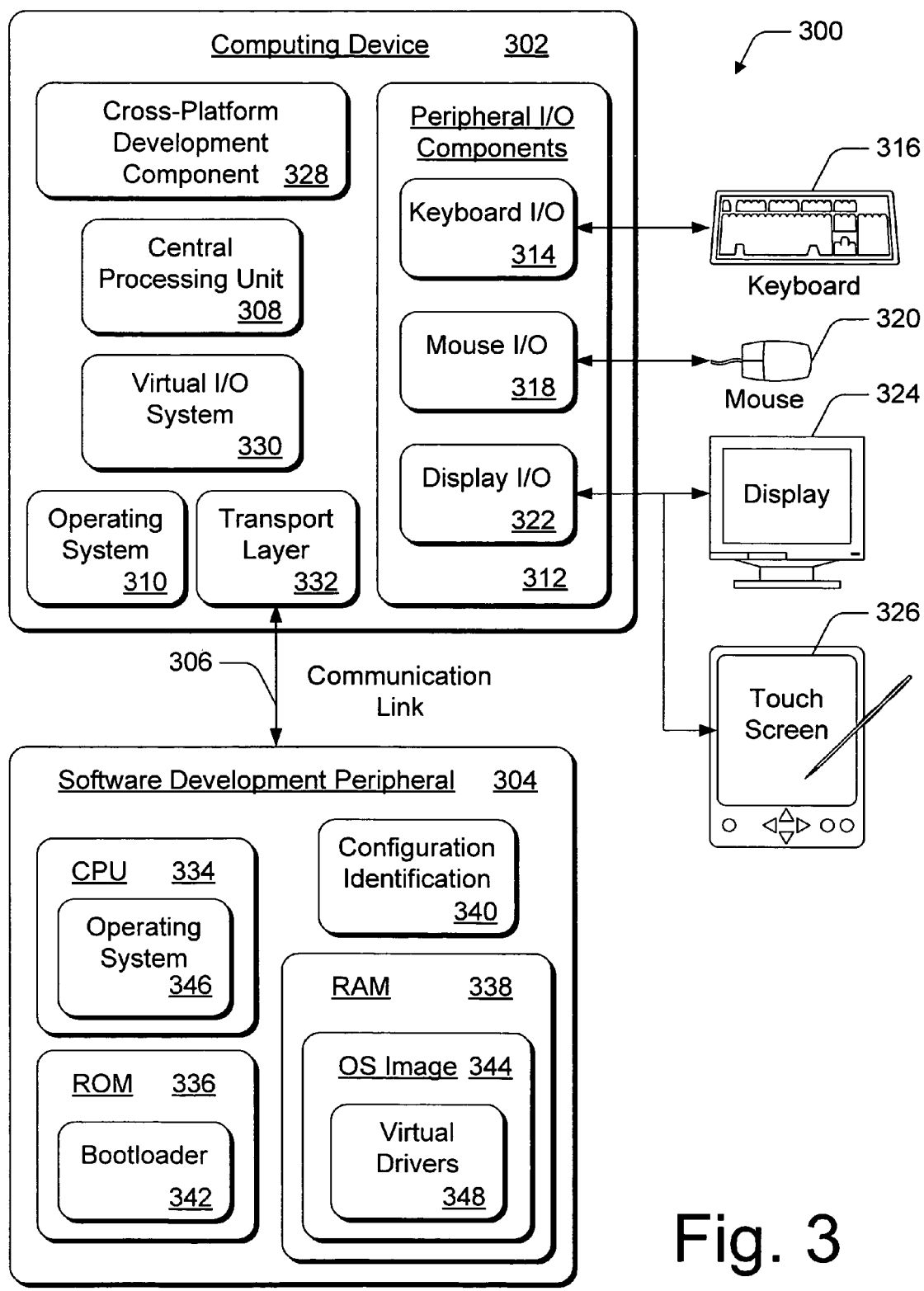
FIG. 3 illustrates an exemplary cross-platform development system with a software development peripheral.

FIG. 3 illustrates a cross-platform development system 300 having components that can be implemented within a computing device, or the components can be distributed within a computing system having more than one computing device. The cross-platform development system 300 includes a computing device 302 coupled with a software development peripheral 304 via a communication link 306. See the description of "Exemplary Computing System and Environment" below for specific examples and implementations of networks, computing systems, computing devices, and components that can be used to implement the invention described herein.

Computing device 302 includes a central processing unit 308, an operating system 310, and a system of peripheral input/output components 312, such as device drivers and connectors, to couple and support external input/output devices for computing device 302. The peripheral input/output components 312 include a keyboard input/output 314 for an external keyboard 316, a mouse input/output 318 for an external mouse 320, and a display input/output 322 for an external display device 324 and/or external touch screen device 326.

Computing device 302 also includes a cross-platform development component 328, a virtual input/output system 330, and a debug transport layer 332. The debug transport layer 332 is a connection interface for the communication link 306 between computing device 302 and the software development peripheral 304. Communication link 306 can be implemented as a USB (universal serial bus), or Ethernet connection, for example.

Software development peripheral 304 includes a central processing unit 334, a read only memory (ROM) 336, a random access memory (RAM) 338, and a configuration identification component 340. The configuration identification component 340 can be an independent component of software development peripheral 304, or component 340 can be a software component and/or a unique identifier component stored in bootloader application 342 in ROM 336. The bootloader application 342 is the only software code that is maintained on the software development peripheral 304 when the peripheral device is first initialized. The bootloader application 342 communicates with computing device 302, or simply waits to receive an operating system image from computing device 302.

When a developer configures and builds a new operating system, an image 344 of the new operating system is downloaded to RAM 338 on software development peripheral 304 via the debug transport layer 332 and communication link 306. The operating system image 344 is a self contained binary file that contains embedded operating system 346 and associated components, such as virtual device drivers 348. When the operating system image 344 is downloaded and stored in RAM 338, bootloader 342 transfers execution of the software development peripheral 304 to the new operating system 346 which executes on central processing unit 334.

The software development peripheral 304 communicates information, such as debug information and image data, generated by operating system 346 to the virtual input/output system 330 at computing device 302 via communication link 306 and debug transport layer 332. Keyboard, mouse, and display information is remoted to computing device 302 with virtual device drivers 348 that are included as part of the operating system image 344 when the image is downloaded from computing device 302 to the software development peripheral 304. The virtual drivers 348 communicate input/output information and data to the computing device 302. For example, operating system 346 generates image data that is communicated to the virtual input/output system 330 at computing device 302 via a virtual display device driver 348, communication link 306, and debug transport layer 332 to display device 324.

The software development peripheral 304 is a resource that can be used as a development tool to develop software applications and operating systems for a particular platform that is different from the computing device 302 platform. From a developer's perspective, the software development peripheral 304 appears as a processor emulator in that it is easy to implement and interface with. A developer can debug and execute the new operating system 346 that is executing software development peripheral 304 with the keyboard 316, mouse 320, display device 324, and/or touch screen device 326 connected to computing device 302.

The virtual input/output system 330 is an application that runs on computing device 302 and is the interface component between computing device 302 and the virtual drivers 348 on the software development peripheral 304. The virtual input/output system 330 receives the information generated by operating system 346 from the virtual drivers 348. Additionally, the virtual input/output system 330 generates an associated virtual input/output display, such as a debugging window, on display device 324, or touch screen device 326. When a developer is interfacing with the software development peripheral system from the virtual input/output display window, all of the keyboard, mouse, display, and touch screen input/outputs are routed to and from the software development peripheral 304.

When a different window is selected on the computing device display 324, the focus of the input/outputs from the keyboard, mouse, display, and touch screen peripheral devices switches back to computing device 302. It is to be appreciated that a virtual input/output display can still be displayed in the background to display changes and updates generated by operating system 346 on software development peripheral 304.

The software development peripheral 304 facilitates operating system kernel level debugging and testing. That is, a kernel level debugging program stops the execution of an entire system running on software development board 304 and no threads are scheduled. Debugging at the kernel level requires the low level support features such as the bootloader 342, and a kernel-independent transport layer 332.

The software development peripheral 304 can be implemented as a recognizable plug-and-play device. The cross-platform development component 328 of computing device 302 recognizes the configuration identification 340 of the software development peripheral 304 when the software development peripheral is communicatively linked with computing device. The cross-platform development component 328 recognizes central processing unit 334 on the software development peripheral 304 as a pre-defined processor type, such as an Intel®, Hitachi®, Motorola®, SHX®, or other type of processor. When a developer configures and builds a new operating system, for example, the cross-platform development component 328 generates the operating system image 344 to include processor specific components, such as the virtual drivers 348. In a build environment, decisions about which drivers and other components to include with a new operating system 346 are automated by the cross-platform development component 328.

Figure 4:
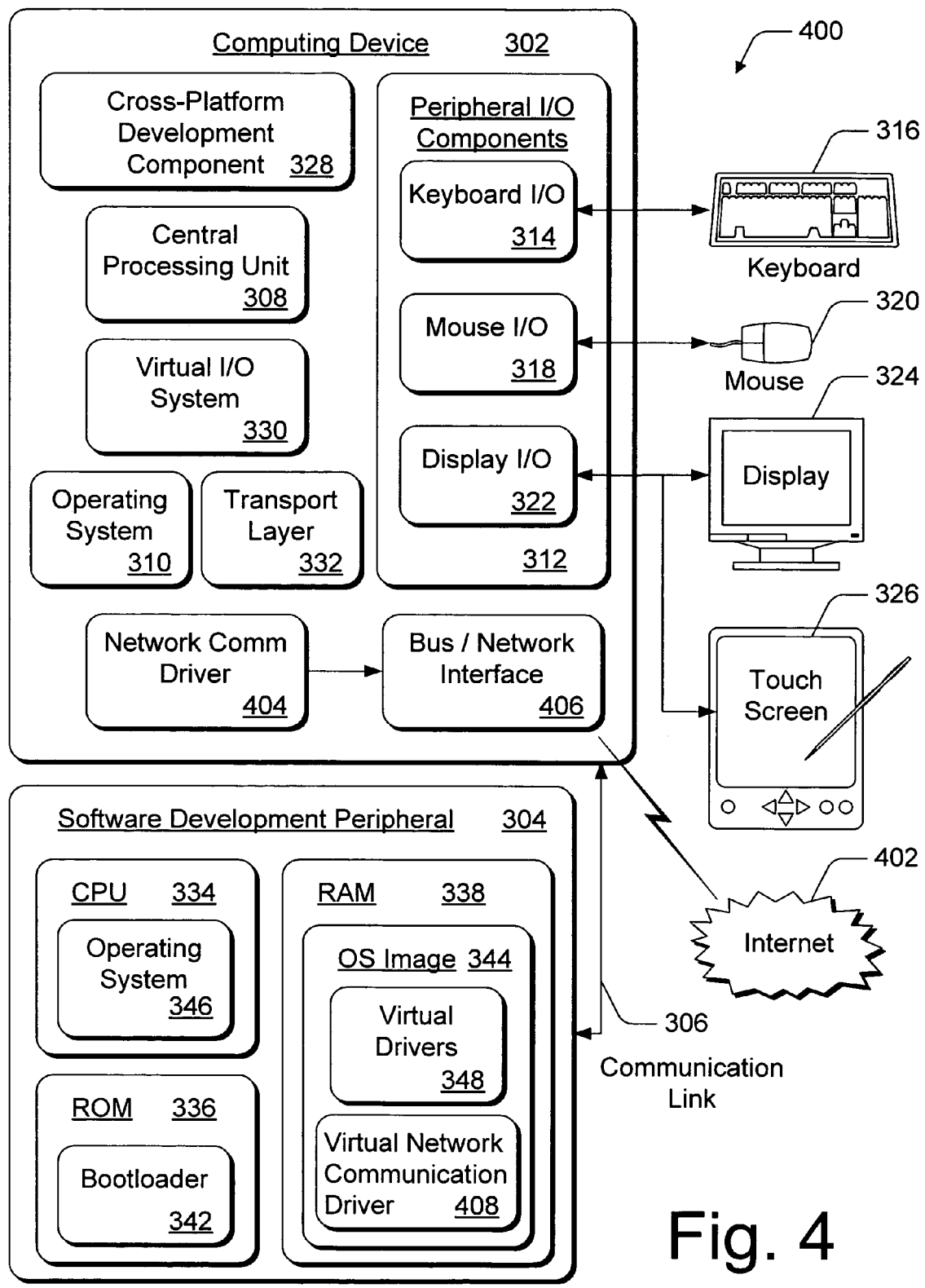
FIG. 4 illustrates the cross-platform development system shown in FIG. 3 with network communication components.

FIG. 4 illustrates a cross-platform development system 400 having network communication components to remote network connectivity, such as to the Internet 402. Computing device 302 includes a network communication driver 404 that communicates information with virtual input/output system 330 and communicates with a bus and/or network interface 408. The bus and/or network interface 408 communicates with the network 402.

The software development peripheral 304 includes a virtual network communication driver 408 that communicates information from software development peripheral 304 to the virtual input/output system 330 of computing device 302. Network connectivity information generated by operating system 346 on software development peripheral 304 is communicated from the virtual network communication driver 408 via communication link 306 and via the network communication components of computing device 302 to network 402.

Figure 5:
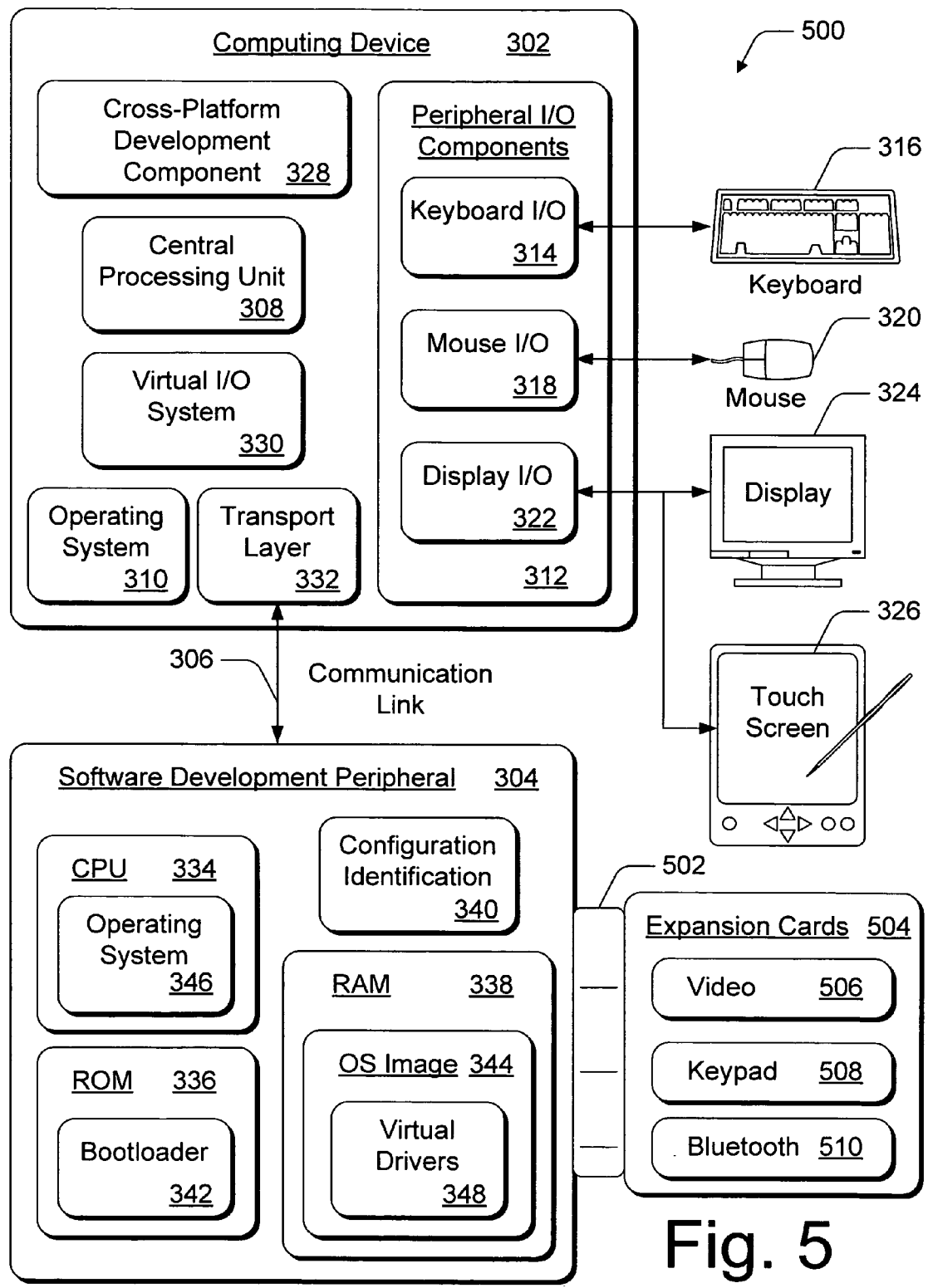
FIG. 5 illustrates the cross-platform development system shown in FIG. 3 with an expansion component to connect peripheral input/output components.

FIG. 5 illustrates a cross-platform development system 500 having an expansion component 502 to connect input/output devices to software development peripheral 304. External input/output devices and components are connected to the software development peripheral 304 via expansion cards 504. The expansion cards 504 connect components to test with new operating system 346 and/or with variations of central processing unit 334, such as a video or display device 506, a keypad input 508 such as for a cellular phone, a wireless input/output such as a Bluetooth component 510, and other input/output devices.

Figure 6:
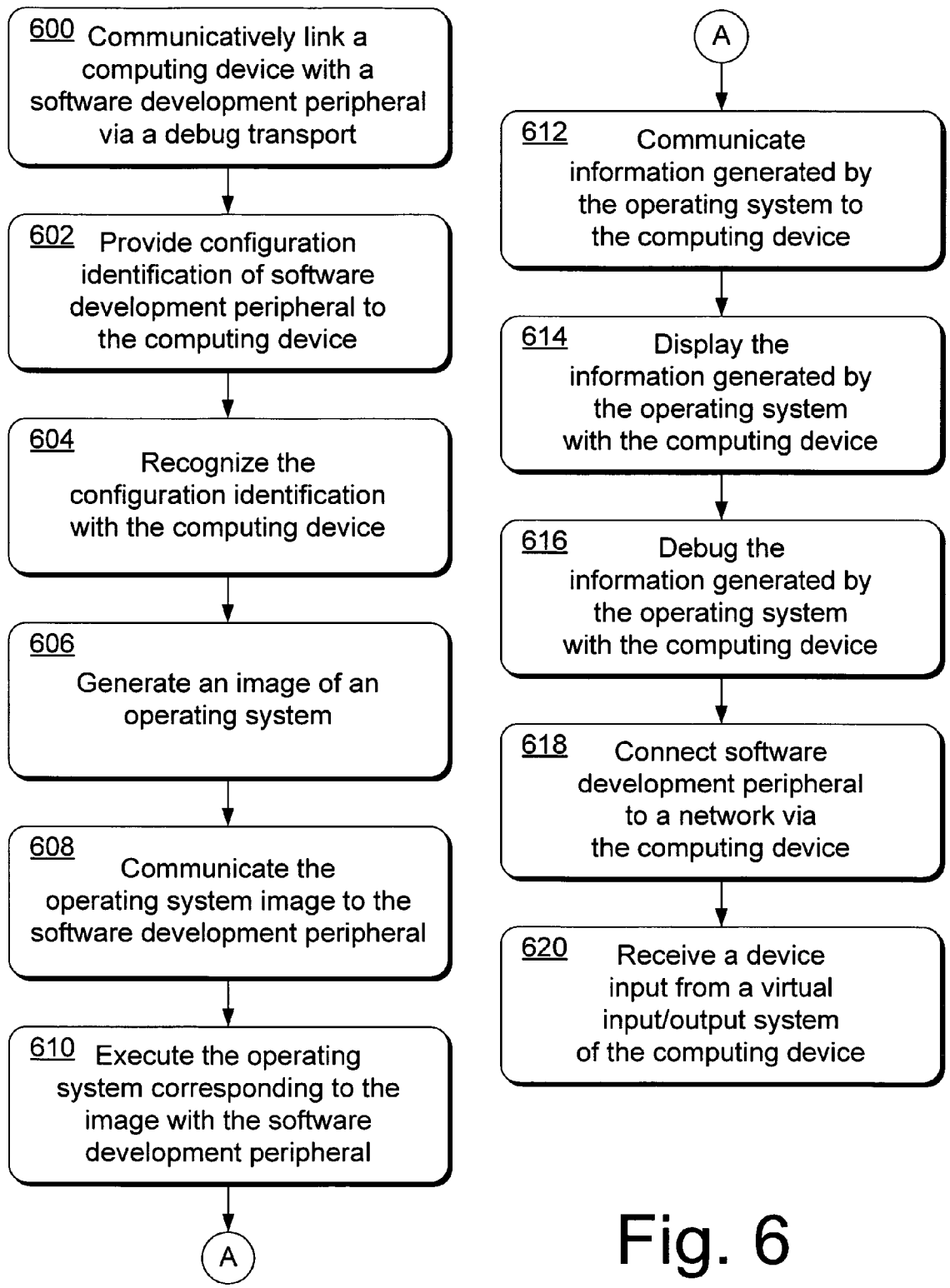
FIG. 6 is a flow diagram of a method for cross-platform development with a software development peripheral.

FIG. 6 illustrates a method for cross-platform development with a software development peripheral. The order in which the method is described is not intended to be construed as a limitation. Furthermore, the method can be implemented in any suitable hardware, software, firmware, or combination thereof.

At block 600, a computing device is communicatively linked with a software development peripheral via debug transport. At block 602, the software development peripheral provides a configuration identification to a cross-platform development component of the computing device. At block 604, the cross-platform development component of the computing device recognizes the configuration identification.

At block 606, an image of an operating system is generated. The image of the operating system can be generated with the cross-platform development component of the computing device, and the image can be generated to correspond to the configuration identification of the software development peripheral. At block 608, the image of the operating system is communicated to the software development peripheral.

At block 610, the operating system corresponding to the image is executed with the software development peripheral. At block 612, information generated by the operating system is communicated to the computing device. The information is communicated from the software development peripheral with a virtual device driver to a virtual input/output system of the computing device via the debug transport.

At block 614, the information generated by the operating system at the software development peripheral is displayed with the computing device. The information can include image data, for example, that is displayed with a display device connected to the computing device. At block 616, the information generated by the operating system is debugged with the cross-platform development component of the computing device.

At block 618, the software development peripheral is connected to a network via a network communication driver of the computing device. The network communication driver is communicatively linked with the network and with a virtual network communication driver of the software development peripheral.

At block 620, the software development peripheral receives a device input from a virtual input/output system of the computing device. The software development peripheral can receive a keyboard or pointing device input, for example, from the virtual input/output system of the computing device, where the keyboard or pointing device is connected to the computing device.

Figure 7:
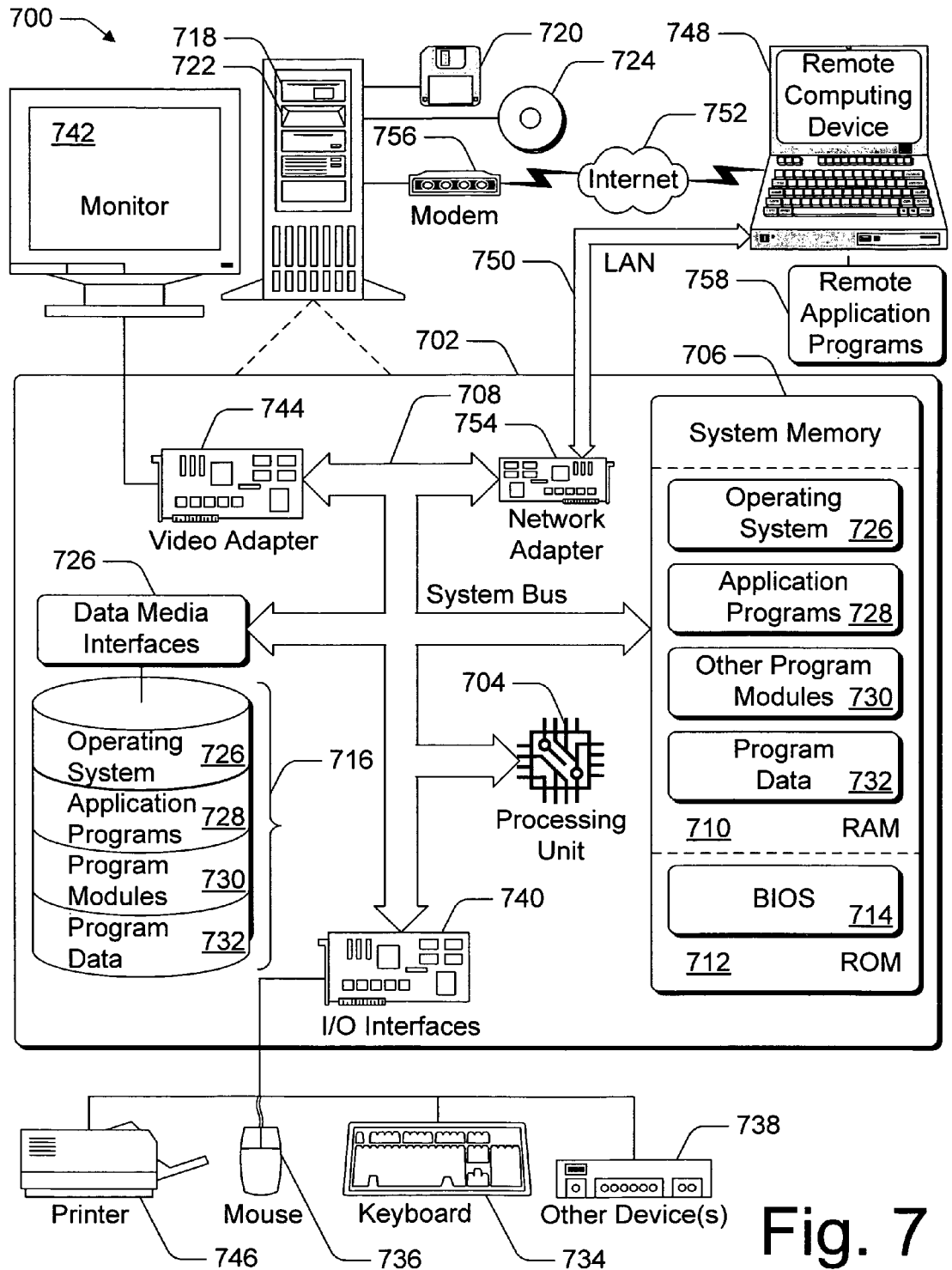
FIG. 7 is a diagram of computing systems, devices, and components in an environment that can be used to implement the invention described herein.

FIG. 7 illustrates an example of a computing environment 700 within which the computer, network, and system architectures described herein can be either fully or partially implemented. Exemplary computing environment 700 is only one example of a computing system and is not intended to suggest any limitation as to the scope of use or functionality of the network architectures. Neither should the computing environment 700 be interpreted as having any dependency or requirement relating to any one or combination of components illustrated in the exemplary computing environment 700.

The computer and network architectures can be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, gaming consoles, distributed computing environments that include any of the above systems or devices, and the like.

Methods for cross-platform development with a software development peripheral may be described in the general context of computer-executable instructions, such as program modules, being executed by a computer. Generally, program modules include routines, programs, objects, components, data structures, etc. that perform particular tasks or implement particular abstract data types. The systems and methods for cross-platform development with a software development peripheral may also be practiced in distributed computing environments where tasks are performed by remote processing devices that are linked through a communications network. In a distributed computing environment, program modules may be located in both local and remote computer storage media including memory storage devices.

The computing environment 700 includes a general-purpose computing system in the form of a computer 702. The components of computer 702 can include, by are not limited to, one or more processors or processing units 704, a system memory 706, and a system bus 708 that couples various system components including the processor 704 to the system memory 706.

The system bus 708 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer system 702 typically includes a variety of computer readable media. Such media can be any available media that is accessible by computer 702 and includes both volatile and non-volatile media, removable and non-removable media. The system memory 706 includes computer readable media in the form of volatile memory, such as random access memory (RAM) 710, and/or non-volatile memory, such as read only memory (ROM) 712. A basic input/output system (BIOS) 714, containing the basic routines that help to transfer information between elements within computer 702, such as during start-up, is stored in ROM 712. RAM 710 typically contains data and/or program modules that are immediately accessible to and/or presently operated on by the processing unit 704.

Computer 702 can also include other removable/non-removable, volatile/non-volatile computer storage media. By way of example, FIG. 7 illustrates a hard disk drive 716 for reading from and writing to a non-removable, non-volatile magnetic media (not shown), a magnetic disk drive 718 for reading from and writing to a removable, non-volatile magnetic disk 720 (e.g., a "floppy disk"), and an optical disk drive 722 for reading from and/or writing to a removable, non-volatile optical disk 724 such as a CD-ROM, DVD-ROM, or other optical media. The hard disk drive 716, magnetic disk drive 718, and optical disk drive 722 are each connected to the system bus 708 by one or more data media interfaces 726. Alternatively, the hard disk drive 716, magnetic disk drive 718, and optical disk drive 722 can be connected to the system bus 708 by a SCSI interface (not shown).

The disk drives and their associated computer-readable media provide non-volatile storage of computer readable instructions, data structures, program modules, and other data for computer 702. Although the example illustrates a hard disk 716, a removable magnetic disk 720, and a removable optical disk 724, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 716, magnetic disk 720, optical disk 724, ROM 712, and/or RAM 710, including by way of example, an operating system 726, one or more application programs 728, other program modules 730, and program data 732. Each of such operating system 726, one or more application programs 728, other program modules 730, and program data 732 (or some combination thereof) may include an embodiment of the systems and methods for cross-platform development with a software development peripheral.

Computer system 702 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 702 via input devices such as a keyboard 734 and a pointing device 736 (e.g., a "mouse"). Other input devices 738 (not shown specifically) may include a microphone, joystick, game pad, satellite dish, serial port, scanner, and/or the like. These and other input devices are connected to the processing unit 704 via input/output interfaces 740 that are coupled to the system bus 708, but may be connected by other interface and bus structures, such as a parallel port, game port, or a universal serial bus (USB).

A monitor 742 or other type of display device can also be connected to the system bus 708 via an interface, such as a video adapter 744. In addition to the monitor 742, other output peripheral devices can include components such as speakers (not shown) and a printer 746 which can be connected to computer 702 via the input/output interfaces 740.

Computer 702 can operate in a networked environment using logical connections to one or more remote computers, such as a remote computing device 748. By way of example, the remote computing device 748 can be a personal computer, portable computer, a server, a router, a network computer, a peer device or other common network node, and the like. The remote computing device 748 is illustrated as a portable computer that can include many or all of the elements and features described herein relative to computer system 702.

Logical connections between computer 702 and the remote computer 748 are depicted as a local area network (LAN) 750 and a general wide area network (WAN) 752. Such networking environments are commonplace in offices, enterprise-wide computer networks, intranets, and the Internet. When implemented in a LAN networking environment, the computer 702 is connected to a local network 750 via a network interface or adapter 754. When implemented in a WAN networking environment, the computer 702 typically includes a modem 756 or other means for establishing communications over the wide network 752. The modem 756, which can be internal or external to computer 702, can be connected to the system bus 708 via the input/output interfaces 740 or other appropriate mechanisms. It is to be appreciated that the illustrated network connections are exemplary and that other means of establishing communication link(s) between the computers 702 and 748 can be employed.

In a networked environment, such as that illustrated with computing environment 700, program modules depicted relative to the computer 702, or portions thereof, may be stored in a remote memory storage device. By way of example, remote application programs 758 reside on a memory device of remote computer 748. For purposes of illustration, application programs and other executable program components, such as the operating system, are illustrated herein as discrete blocks, although it is recognized that such programs and components reside at various times in different storage components of the computer system 702, and are executed by the data processor(s) of the computer.

The illustrated and described systems and methods for cross-platform development with a software development peripheral is a resource that provides seamless operating system development from a desktop computing device while utilizing already available peripheral input/output devices such as a display device, touch screen, keyboard, mouse, and similar input/output devices connected to the desktop computing device. Development results for an operating system running on a software development peripheral can be remotely displayed onto a display device connected to the desktop computing device for easier development interface.

Although the systems and methods have been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method, performed with a software development peripheral having a processor and a memory, the method comprising:
    providing, by the software development peripheral, a configuration identification of the software development peripheral to an operating system development component of a host computing device, wherein, as a result of receiving the configuration identification, the operating system development component recognizes the processor on the software development peripheral as a recognized predefined processor type;
    receiving, in the memory of the peripheral, in response to the providing the configuration identification, an operating system image to be tested, the operating system image being generated at the host computing device, wherein the operating system image includes processor-specific components automatically included by the host computing device based on the configuration identification of the recognized predefined processor type provided to the operating system development component of the host computing device by the software development peripheral, wherein the automatically included processor-specific components include virtual device drivers automatically included based on the recognized predefined processor type;
    executing, by the processor of the software development peripheral, the operating system corresponding to the operating system image received from the host computing device; and
    communicating, by the processor of the software development peripheral, using the processor-specific virtual device drivers, test information generated by the operating system corresponding to the operating system image to the operating system development component of the host computing device,
    wherein the communicating further comprises communicating image data generated by the operating system for display at the host computing device,
    wherein a developer interfaces with the software development peripheral via a virtual input/output display window at the host computing device,
    wherein keyboard, mouse and display input/outputs at the host computing device are routed to and from the software development peripheral.

2. The method as recited in claim 1, further comprising communicatively linking to a network with a virtual network communication driver, the virtual network communication driver communicatively linked with a network communication driver of the host computing device, wherein the virtual network communication driver is one of the automatically selected processor-specific components.

3. The method as recited in claim 1, wherein communicating includes communicating the information generated by the operating system to the host computing device with a virtual device driver via a debug transport, wherein the virtual device driver is one of the automatically selected processor-specific components.

4. The method as recited in claim 1, wherein the providing the configuration identification is carried out by an independent component of the software development peripheral.

5. The method as recited in claim 1, wherein the providing the configuration identification is carried out by a software component stored in a bootloader application in the memory of the software development peripheral.

6. The method as recited in claim 1, wherein the operating system image to be tested is generated at the host computing device by the operating system development component which is configured to automatically determine which drivers and components to include when generating an operating system image for a specific processor type from among a plurality of different predefined processor types.

7. The method as recited in claim 1, wherein the operating system image to be tested is generated at the host computing device by the operating system development component which is configured to recognize the software development peripheral as a plug-and-play device by recognizing the received configuration identification when the software development peripheral is communicatively linked to the host computing device.

8. One or more computer-readable storage media comprising computer executable instructions executed by a host computing device to carry out a method with a software development peripheral, the method comprising:
   receiving, by the host computing device, configuration identification from the software development peripheral;
   recognizing, by the host computing device, as a result of receiving the configuration identification, a processor on the software development peripheral as a recognized predefined processor type from among a plurality of predefined processor types;
   generating, by the host computing device, an operating system image of an operating system to be tested based on the recognized predefined processor type, wherein the operating system image is automatically generated to include processor-specific components corresponding to the received configuration identification of the software development peripheral, wherein the processor-specific components include processor-specific virtual device drivers automatically included based on the recognized predefined processor type;
   downloading the generated operating system image to a memory on the software development peripheral, for the processor on the software development peripheral to execute the operating system corresponding to the operating system image; and
   receiving at the host computing device, from the software development peripheral, via the processor-specific virtual device drivers, test information generated by the operating system corresponding to the operating system image downloaded from the host computing device to the software development peripheral,
   wherein the receiving further comprises receiving image data generated by the operating system at a virtual input/output system of the host computing device for display,
   wherein a developer interfaces with the software development peripheral via a virtual input/output display window at the host computing device,
   wherein keyboard, mouse and display input/outputs at the host computing device are routed to and from the software development peripheral.

9. The one or more computer-readable media as recited in claim 8, wherein the downloading comprises downloading the operating system image as a self-contained binary file including an embedded operating system and the processor-specific components.

10. The one or more computer-readable media as recited in claim 8, wherein the generating the operating system image is performed at the host computing device by a cross-platform development component which is configured to automatically determine which drivers and components to include when generating the operating system image for a specific processor type from among a plurality of different predefined processor types.

11. A system comprising:
   a plug-and-play software development peripheral in communication with a host computing device, the plug-and-play software development peripheral including a processor and a memory;
   wherein the plug-and-play software development peripheral is configured to provide a configuration identification of the plug-and-play software development peripheral to an operating system development component of the host computing device as a result of being placed in communication with the host computing device, wherein the operating system development component recognizes the processor of the plug-and-play software development peripheral as a particular predefined processor type from among a plurality of predefined processor types;
   wherein the plug-and-play software development peripheral is configured to receive, at the memory of the plug-and-play software development peripheral, an operating system image of an operating system to be tested, wherein the operating system image is generated with the operating system development component of the host computing device based upon the recognized particular predefined processor type, wherein the operating system image is downloaded to the plug-and-play software development peripheral as a self-contained binary file including processor-specific virtual device drivers automatically included based on the recognized predefined processor type;
   wherein the plug-and-play software development peripheral is configured to execute the operating system corresponding to the operating system image downloaded at the plug-and-play software development peripheral from the host computing device; and
   wherein the plug-and-play software development peripheral is configured to communicate, from the plug-and-play software development peripheral, via the automatically determined processor-specific virtual device drivers, test information generated by the operating system corresponding to the operating system image to the operating system development component of the host computing device, wherein the communicating further comprises communicating image data generated by the operating system to the host computing device for display, wherein a developer interfaces with the plug-and-play software development peripheral via a virtual input/output display window at the host computing device, wherein keyboard, mouse and display input/outputs at the host computing device are routed to and from the plug-and-play software development peripheral.

12. The system as recited in claim 11, wherein the configuration identification is provided by an independent component of the software development peripheral.

13. The system as recited in claim 11, wherein the configuration identification is provided by a software component stored in a bootloader application in the memory of the software development peripheral.

14. The system as recited in claim 11, wherein the information generated by the operating system is communicated to the host computing device by the plug-and-play software development peripheral with the automatically determined virtual device drivers via a debug transport.

15. The system as recited in claim 11, wherein the operating system image to be tested is generated by the cross-platform development component of the host computing device, which is configured to recognize the plug-and-play software development peripheral as a plug-and-play device by recognizing the provided configuration identification when the software development peripheral is communicatively linked to the host computing device.

16. The system as recited in claim 11, wherein the plug-and-play software development peripheral is configured to have execution of the operating system stopped at a kernel level by a kernel level debugging program communicating with the plug-and-play software development peripheral via a kernel-independent transport layer.

* * * * *